United States Patent
Jaeger et al.

(10) Patent No.: US 6,744,942 B1
(45) Date of Patent: Jun. 1, 2004

(54) OPTICAL CROSS-CONNECT

(75) Inventors: Hubert A. Jaeger, McLean, VA (US); Oliver Jahreis, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 23 days.

(21) Appl. No.: 10/182,610
(22) PCT Filed: Nov. 2, 2000
(86) PCT No.: PCT/DE00/03853
§ 371 (c)(1), (2), (4) Date: Sep. 27, 2002
(87) PCT Pub. No.: WO01/58202
PCT Pub. Date: Aug. 9, 2001

(30) Foreign Application Priority Data

Jan. 31, 2000 (DE) .......................................... 100 04 082

(51) Int. Cl.[7] .............................................. G02B 6/36
(52) U.S. Cl. .............................. 385/16; 385/17; 385/24; 385/100; 385/135
(58) Field of Search ........................... 385/16–24, 100, 385/134, 135, 136, 137

(56) References Cited

U.S. PATENT DOCUMENTS

| | | | |
|---|---|---|---|
| 5,337,400 A | | 8/1994 | Morin et al. |
| 5,448,575 A | | 9/1995 | Hashizume |
| 5,461,693 A | * | 10/1995 | Pimpinella ................... 385/135 |
| 5,663,820 A | | 9/1997 | Shiragaki |
| 5,793,909 A | * | 8/1998 | Leone et al. ................... 385/24 |
| 2002/0102050 A1 | * | 8/2002 | Chauvin et al. ............... 385/24 |
| 2003/0206687 A1 | * | 11/2003 | Pfeiffer et al. ................ 385/22 |

FOREIGN PATENT DOCUMENTS

DE     43 14 354     7/1994

OTHER PUBLICATIONS

"Photonic Inter–Module Connector Using 8×8 optical Switches for Near–Future Electronic Switching Systems," Himeno et al. pp. 155–162.

* cited by examiner

Primary Examiner—Hemang Sanghavi
(74) Attorney, Agent, or Firm—Bell Boyd & Lloyd LLC

(57) ABSTRACT

An optical cross-connect having a distribution rack, which can be monitored via a network management system, having external and internal optical distribution inputs and distribution outputs, wherein the equipment complexity for connecting optical connections as required between the inputs and outputs is greatly reduced.

7 Claims, 2 Drawing Sheets

OPTICAL CROSS-CONNECT

The present invention relates to an optical cross-connect having at least one controllable switching module which has optical inputs and outputs.

Optical transmission networks based on high bit-rate, fiber transmission paths with optical cross-connects, and possibly also with optical frequency multiplexing, represent the future transport network for transmission of large amounts of data for future telecommunication.

The growth to be expected in the field of data transmission via optical transmission networks, particularly as a result of the increase in Internet access providers and Internet users, makes it necessary to design such optical transmission networks such that they can be scaled as easily as possible by their operators. That is to say, the upgrade capability of an optical cross-connect and the linking of additional users to widely differing connection requirements must be extremely flexible, and must be feasible within a very short time and with a reasonable level of technical complexity.

In this case, with regard to optical cross-connects that are in the form of fiberoptic distribution panels, optical connections are implemented in such a way that optical connections are passed on manually, such as via an optical plug connection, in the respective optical cross-connects. For this purpose, two optical conductors, which each have a plug connection, are connected to one another via such an optical plug connection, with the optical plug connection having an optical connecting conductor and two plugs, which are fitted to each of the ends of the optical connecting conductor. The plugs for the optical connecting conductor are inserted into the optical connections of the optical conductors that are to be connected which results in an optical connection between a first optical conductor or a supply line fiber and a second optical conductor or an output fiber. In order to reduce the probability of a manual incorrect configuration of the optical connection or of the optical plug connection, DE 19920452 discloses an optical plug connection which, in addition to the optical plug connection, has an electrical connection for verification of the optical plug connection. In this case, the configuration of the optical plug connection is indicated to the network management system, with the aid of the additional electrical connection, as soon as the optical connection is made. Furthermore, if required, the network management system can determine the present configuration state of each optical plug connection at any time. Such optical cross-connects, which are in the form of fiberoptic distribution panels, cannot be controlled, however, via a central control unit or the network management system, so that an enormous amount of effort, in terms of both time and money, is required to produce an optical connection due to the manual actions required for this purpose by specialist personnel on the optical cross-connect. For this reason, static connections are normally set up via an optical cross-connect designed in this way in order to keep the financial cost of manual configuration of the optical cross-connect as low as possible.

Controllable optical cross-connects or switching modules are known for producing dynamic optical connections; that is to say optical connections which are reconfigured a number of times within one day. For example, in this context, see, in particular, DE 4314354, in which switching matrices are provided with the aid of optical switches. This allows optical connections to be connected electronically via a network management system, thus avoiding the manual "insertion" of an optical connection, which often takes a long time. However, one disadvantage is that expansion, which is the increasing of the number of optical interfaces in the optical automatically controllable cross-connect or switching module, can be achieved only by a disproportionate increase in the equipment complexity. If, by way of example, it is intended to double the number of optical interfaces in a controllable optical cross-connect, then the optical switching modules in the switching matrix must be cascaded in order to ensure minimum freedom from blocking in the controllable switching module. In some circumstances, depending on the required freedom from blocking for the controllable switching module, such cascading in order to double the number of optical interfaces can lead to the number of optical switching modules being more than quadrupled. In addition, the cascading of optical switching modules increases the forward loss in the optical cross-connect, so that additional regeneration of the optical signal which is transmitted via the optical cross-connect or the cascade of controllable switching modules may be necessary.

An object of the present invention is to provide an optical cross-connect of the type mentioned initially such that the equipment complexity for connecting optical connections as required between the inputs and outputs of an optical cross-connect is reduced.

SUMMARY OF THE INVENTION

The major aspect of the optical cross-connect according to the present invention is that a distribution rack is provided which can be monitored via a network management system and has external and internal optical distribution inputs and distribution outputs, and whose external and internal optical distribution inputs and distribution outputs can be connected within the distribution rack via a number of optical connecting conductors, which each have an additional electrical conductor for verification of the optical connection. Furthermore, according to the present invention, a number of the internal optical distribution outputs are connected to the inputs of the controllable switching module, and the outputs of the controllable switching module are connected to a number of internal optical distribution inputs, with the controllable switching module being controlled taking account of the optical connections which are verified by the network management system. The verification of the connected or inserted optical connection within the distribution rack by the network management system advantageously results in up-to-date information about the configuration of the optical cross-connect, and this can be used for controlling the controllable switching module. Thus, it is possible for the network administrator, which serves the network management system, to pass on dynamic connections within a very short time, without the servicing personnel having to manually produce the optical plug connections required for this purpose, on the optical cross-connect, which is generally installed several kilometers away. In consequence, depending on the proportion of the dynamic optical connections in the total number of optical connections which can be connected via the optical cross-connect, it is possible to control the number of automatically controllable switching modules or optical interfaces as required; that is to say, if the requirement for automatically controllable optical interfaces in the optical cross-connect increases, then further controllable switching modules can be connected between the internal distribution inputs and distribution outputs of the distribution rack. Thus, it is possible, in a particularly advantageous manner, to increase the number of optical connections which can be connected in the optical cross-connect according to the present invention, with only a small amount of equipment complexity.

According to a further embodiment of the optical cross-connects according to the present invention, information about the optical connections which are connected from external optical distribution inputs to internal optical distribution outputs, and about the optical connections which are connected from the internal optical distribution inputs to external optical distribution outputs is available to the network management system on the basis of the verification, these optical connections being the connections which are taken into account in order to control the controllable switching module such that, in order to automatically pass on an optical connection from a specific external optical distribution input to a specific external optical distribution output, the internal optical distribution output which is connected to the specific external optical distribution input via an optical connection, and the internal optical distribution input which is connected to the specific external optical distribution output via a further optical connection, are determined with the aid of the network management system, and the determined internal optical distribution output is passed on to the determined internal distribution input with the aid of the controllable switching module. For a connection request between an external optical distribution input and an external optical distribution output and/or supply line/output fibers connected to them, the present optical connection for the respective internal optical distribution input or output can be determined by the network management system, and the desired connection then can be passed on via the controllable switching module. In consequence, dynamic optical connections from an optical supply line fiber can be passed on in a particularly advantageous manner as required to different optical output fibers. In this case, the network management system can monitor the internally connected optical connection before the switching process.

According to the present invention, the optical cross-connect has optical interfaces which are provided for connection of the external optical distribution inputs of the distribution rack to optical supply line fibers, and of the external optical distribution outputs to optical output fibers. Furthermore, according to the present invention, the external and internal optical distribution inputs and distribution outputs of the distribution rack are in the form of combined optoelectrical connections. The configuration of the external and internal optical distribution inputs and distribution outputs as combined optoelectrical connections, according to the present invention, allows for the present configuration of the inserted optical connections in the distribution rack to be accessible to the network management system; that is to say, the electrical connection to be set up in addition to the optical connection in the distribution rack can be monitored by the network management system.

According to a further embodiment of the optical cross-connect, a number of controllable switching modules also may be connected in parallel and/or in series in order to enlarge the automatically controllable optical interfaces of the optical cross-connect. The connection of a number of controllable switching modules in parallel according to the present invention allows the number of optical connections which can be connected dynamically by the network management system within the optical cross-connect to be produced with the equipment complexity being minimized. In addition, the connection, according to the present invention, of the controllable switching modules to internal optical distribution inputs and distribution outputs allows the connection configuration of the supply line/output fibers to be retained in a particularly advantageous manner when a number of controllable switching modules are added to the optical cross-connect. That is, the circuitry for the external optical distribution inputs and distribution outputs can be retained, and the reconfiguration of the optical connections within the distribution rack which is required for the expansion is carried out on the internal optical distribution inputs and distribution outputs and in the network management system. This allows the migration of so-called "high dynamic islands" to be implemented within an existing optical cross-connect with considerably reduced equipment complexity.

Additional features and advantages of the present invention are described in, and will be apparent from, the following Detailed Description of the Invention and the Figures.

DETAILED DESCRIPTION OF THE INVENTION

Figure 1:
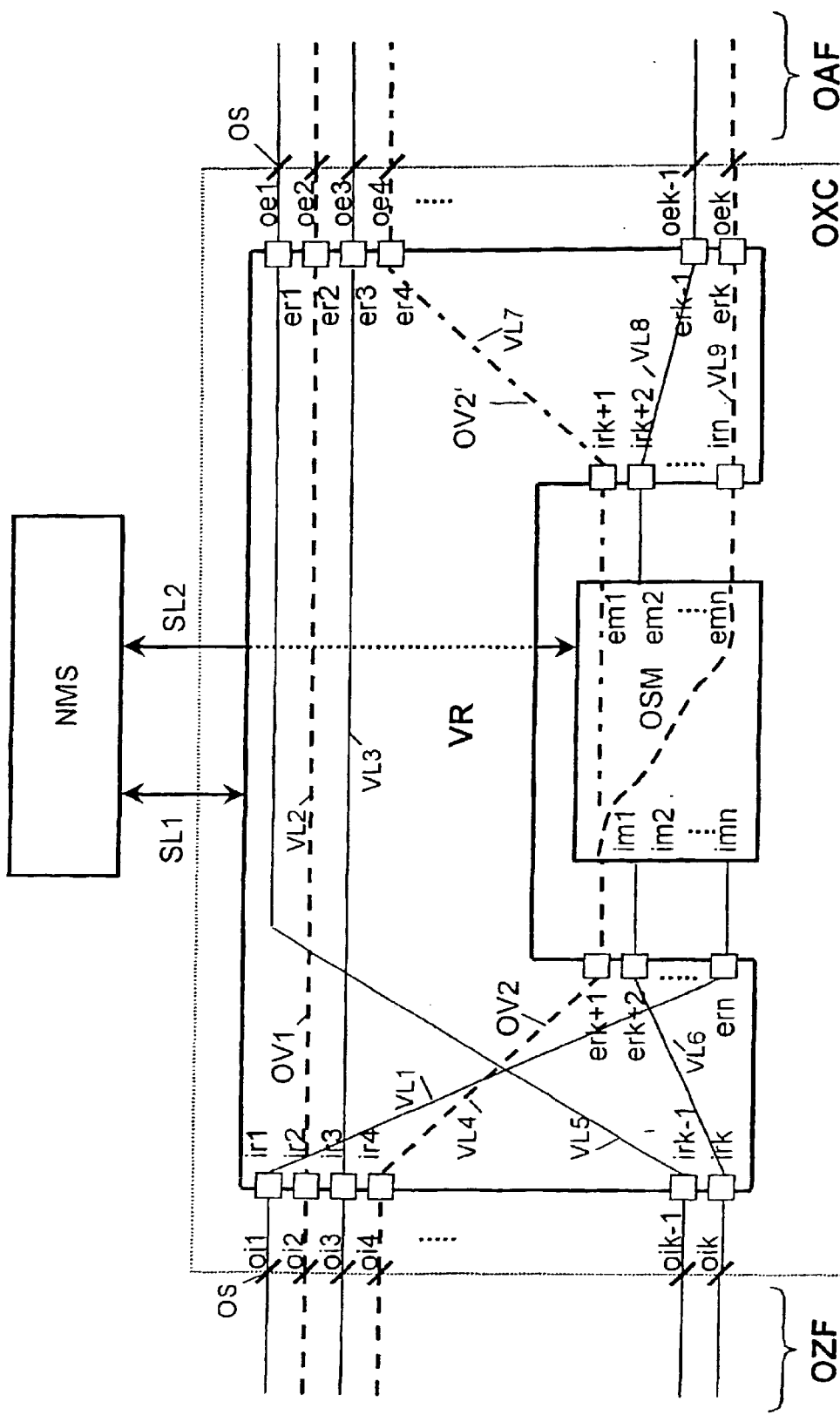
FIG. 1 shows the basic design of the optical cross-connect according to the present invention.

By way of example, FIG. 1 shows the basic design of the optical cross-connect OXC according to the present invention which is connected to a network management system NMS via first and second control lines SL1, SL2. The optical cross-connect OXC has a large number of optical supply line connections oi1 to oik, as well as a large number of optical output connections oe1 to oek, to which optical supply line fibers OZF and optical output fibers OAF, respectively, are connected via optical interfaces OS in each case.

Furthermore, according to the present invention, the optical cross-connect OXC is formed from a controllable switching module OSM, which has optical inputs im1 to imn and outputs em1 to emn, and from a distribution rack VR, which has external and internal optical distribution inputs ir1 to irk and irk+1 to irn and distribution outputs er1 to erk and erk+1 to ern, with the distribution rack VR being connected to the network management system NMS via the first-control lines STL1, and the controllable switching module OSM being connected to the network management system NMS via the second control lines SL2. The external and internal optical distribution inputs ir1 to irk and irk+1 to irn, as well as the distribution outputs er1 to erk and erk+1 to ern, of the distribution rack VR are, according to the present invention, in the form of combined optoelectrical connections and, thus, can be verified via the network management system NMS. That is to say, as described in German Patent Application DE 19920452 "Optical plug connection," the network management system NMS can check the present configuration of each optical distribution input ir1 to irk and irk+1 to irn and distribution output er1 to erk and erk+1 to ern. As such, the network management system always has the latest configuration data and connection data for the external and internal optical distribution inputs ir1 to irk and irk+1 to irn and distribution outputs er1 to erk and erk+1 to ern of the distribution rack VR for the respective optical cross-connect OXC. That is to say, the network management system NMS "knows" which external and internal optical distribution input ir1 to irk and irk+1 to irn and distribution output er1 to erk and erk+1 to ern is in use, and to which further external and internal optical distribution output er1 to erk and erk+1 to ern and distribution input ir1 to irk and irk+1 to irn this is connected. In the exemplary embodiment illustrated in FIG. 1, the external optical distribution inputs ir1 to irk are connected to the supply line connections oi1 to oik, and the external optical distribution outputs er1 to erk are connected to the output connections oe1 to oek. The internal optical distribution inputs irk+1 to irn are connected to the outputs em1 to emn of the controllable switching module OSM, and the internal distribution outputs erk+1 to ern are connected to the inputs im1 to imn of the controllable switching module OSM, with, in the case of the exemplary embodiment illustrated in FIG. 1, by way of example, all the internal distribution inputs irk+1 to irn and distribution outputs erk+1 to ern being connected to the controllable switching module OSM, although this does not represent an essential requirement.

Furthermore, the external optical distribution inputs ir1 to irk within the optical distribution rack VR are connected via optical distribution conductors VL1 to VL8, in the same way as the optical plug connections described in DE 19920454, to external or internal optical distribution outputs er1 to ern; that is to say, an electrical connection is also provided for verification of an optical connection OV. In this case, by way of example, a first external distribution input ir1 in FIG. 1 is connected via a first distribution conductor VL1 to the n-th internal distribution output ern, a second external distribution input ir2 is connected via a second distribution conductor VL2 to a second external distribution output er2, a third external distribution input ir3 is connected via a third distribution conductor VL1 to a third external distribution output er3, and a fourth external distribution input ir4 is connected via a fourth distribution conductor VL4 to a k+1th internal distribution output erk+1. In addition, in the case of the optical cross-connect OXC according to the present invention as illustrated in FIG. 1, a k−1th external distribution input irk−1 is connected via a fifth distribution conductor VL5 to the first external distribution output er1, a k-th external distribution input irk is connected via a sixth distribution conductor VL6 to the k+2th internal distribution output erk+2, a k+1th internal distribution input irk+1 is connected via a seventh distribution conductor VL7 to a fourth external distribution output er4, a k+2th internal distribution input irk+2 is connected via an eighth distribution conductor VL8 to a k−1th external distribution output erk−1, and a n-th internal distribution input irn is connected via a ninth distribution conductor VL9 to a k-th external distribution output erk.

According to the present invention, the optical cross-connect OXC also has at least one controllable switching module OSM, with whose aid optical connections OV can be connected between an optical supply line fiber OZF and an optical output fiber OAF via the network management system NMS, without any manual action. In this case, according to the present invention, a connection is produced, while setting up an optical connection OV via the controllable switching module OSM, first of all within the optical distribution rack VR, between an internal optical distribution output erk+1 to ern, which is connected to the controllable switching module OSM, and an external distribution input ir1 to irk, which is connected to one of the optical interfaces OS. Furthermore, at least one further internal optical connection OV is "inserted" from one of the internal distribution inputs irk+1 to irn, which are connected to the controllable switching module OSM, to one of the external distribution outputs er1 to erk, which are connected to the optical interfaces OS. The network management system NMS now can connect an optical connection OV between an internal distribution output erk+1 to ern, which is connected to the controllable switching module OSM, via the controllable switching module OSM to one of the internal distribution inputs irk+1 to irn, which are connected to the controllable switching module OSM, thus resulting in a complete optical connection OV being produced from an optical supply line fiber OZF to an optical output fiber OAF.

By way of example, FIG. 1 shows a first and a second optical connection OV1, OV2 in the form of a dashed line, with the first optical connection OV1 being provided as an implementation of a static optical connection, and the second optical connection OV2 being provided as an implementation of a dynamic optical connection; that is to say, an optical connection which can be controlled via the network manager. Thus, for example, the second optical connection OV2, which is illustrated in FIG. 1, is connected from the fourth external optical distribution input ir4 via the k+1th internal optical distribution output erk+1 to the first input im1 of the controllable switching module OSM. In the controllable switching module OSM, its optical switch is set by the network management system NMS such that the optical signal which is applied to the first input im1 is diverted to the n-th output emn. The second optical connection OV2 runs from the n-th output emn of the controllable switching module OSM via the n-th internal optical distribution input irn to the k-th external optical distribution output erk, which is connected to the k-th optical output connection oek, and thus to an optical output fiber.

Since the second optical connection OV2 is in the form of a dynamic optical connection, it is possible, such as during night-time operation of the optical cross-connect OXC, for the second optical connection OV2 to be reconfigured by the switching module OSM which is controlled by the network management system NMS. For this purpose, the optical switches in the controllable switching module OSM are switched such that an optical signal which is applied to the first input im1 of the controllable switching module OSM is now diverted, by way of example, to the first output em1 of the controllable switching module osm, which is itself connected to the k+1th internal optical distribution input irk+1 of the optical distribution rack VR. There is an optical connection OV2' from the k+1th internal optical distribution input irk+1 via the seventh distribution conductor VL7 to the fourth external optical distribution output er4 of the optical distribution rack VR, which is connected to the fourth output connection oe4 of the optical cross-connect. Thus, it is possible, for example, for a customer who is connected to the optical cross-connect OXC via an optical supply line fiber OZF which is connected to the fourth supply line connection oi4 to be connected during the daytime to a data network which is connected to the k-th output connection oek via an output fiber OAF while, at night, the same customer is connected to a data server which is connected to the fourth output connection oe4 via an output fiber OAF, via which data server he/she can carry out a daily data backup, as illustrated in FIG. 1 by a dashed-dotted line. The optical cross-connect OXC according to the present invention thus allows optical connections OV to be connected, both statically and dynamically, in an extremely flexible and reliable manner. In this case, the implementation of an optical cross-connect OXC according to the present invention results in a considerable reduction in the equipment complexity that is required with the prior art to provide blocking-free automatically controllable optical cross-connects OXC. Furthermore, the switched optical connections OV can be monitored in a particularly advantageous manner via the network management system NMS on the basis of the verifiable optical distribution conductor VL, which considerably reduces the fault localization and the time penalty required for this purpose.

The cross-connect OXC according to the present invention can have additional switchable switching modules OSM added to it if the requirement for dynamically controllable optical connections OV increases, and these are connected in parallel with the installed controllable optical switching module OSM in the optical cross-connect of the optical distribution rack VR. This allows the number of selectable and dynamically switchable optical connections within the optical cross-connect to be increased.

Figure 2:
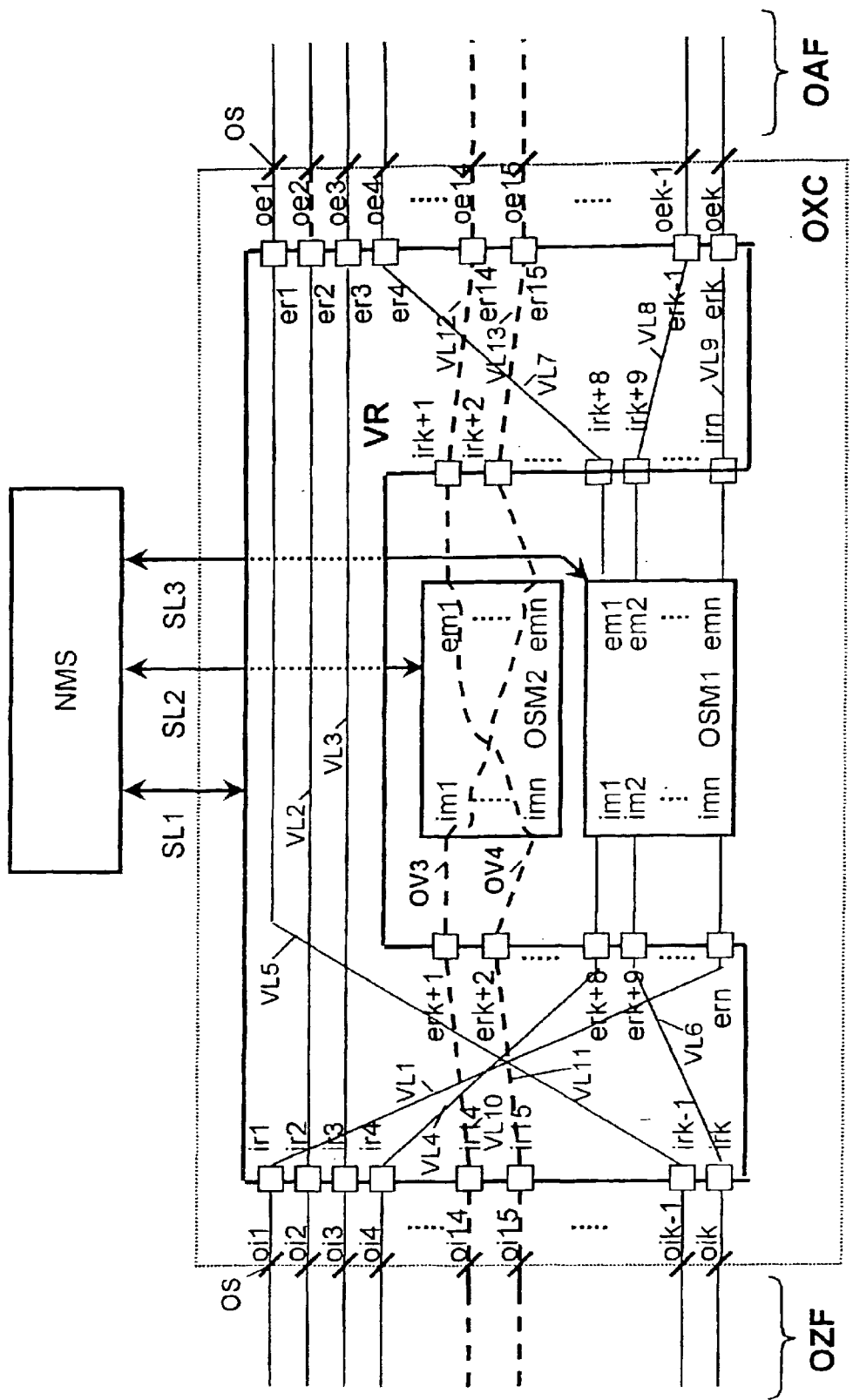
FIG. 2 shows a second controllable switching module added to the optical cross-connect.

By way of example, FIG. 2 shows the addition of a further controllable switching module OSM to the optical cross-connect OXC; that is to say, the optical cross-connect OXC thus has a first and a second optical switching module OSM1, OSM2. Analogously to the optical cross-connect OXC which is illustrated in FIG. 1, the optical distribution rack VR is connected to the network management system NMS via a first control line SL1, the first controllable switching module OSM1 is connected to the network management system NMS via a second control line SL2, and the second controllable switching module OSM2 is connected to the network management system NMS via a third control line SL3. Furthermore, the second controllable switching module OSM2 is physically identical to the first controllable switching module OSM1; that is to say, the first controllable switching module OSM1 has, in the same way as the second controllable switching module OSM2, first to n-th inputs im1 to imn, and first to n-th outputs em1 to emn.

In contrast to FIG. 1, in the optical cross-connect OXC which is illustrated in FIG. 2, the k+1th internal optical distribution output erk+1 is connected to the first input im1 of the second controllable switching module OSM2, the k+2th internal optical distribution output erk+2 is connected to the n-th input irn of the second controllable switching module OSM2, the k+8th internal optical distribution output erk+8 is connected to the first input im1 of the first controllable switching module OSM1, the k+9th internal optical distribution output erk+9 is connected to the second input im2 of the first controllable switching module OSM1, and the n-th internal optical distribution output ern is connected to the n-th input imn of the first controllable switching module OSM1. Furthermore, the first output em1 of the second controllable switching module OSM2 is connected to the k+1th internal optical distribution input irk+1, the n-th output emn of the second controllable switching module OSM2 is connected to the k+2th internal optical distribution input irk+2, the first output em1 of the first controllable switching module OSM1 is connected to the k+8th internal optical distribution input irk+8, the second output em2 of the first controllable switching module OSM1 is connected to the k+9th internal optical distribution input irk+9, and the n-th output emn of the first controllable switching module OSM1 is connected to the n-th internal optical distribution input irn.

In addition to the switched optical connections OV in FIG. 1, FIG. 2 shows, by way of example, a dynamically switchable third and fourth optical connection OV3, OV4— (indicated in FIG. 2 by connections in the form of dashed lines) with the third optical connection OV3 extending from a fourteenth supply line connection oi14 via a tenth optical connecting conductor VL10 to the k+1th internal optical distribution output erk+1, which is, in turn, connected via the first input im1 and the n-th output emn of the second controllable switching module OSM2 to the k+2th internal optical distribution input irk+2. The optical connection from the k+2th internal optical distribution input irk+2 via a thirteenth optical distribution conductor VL13 to the fifteenth external optical distribution connection er15 or the fifteenth optical output connection oe15 represents the remaining part of the third optical connection OV3. The fourth optical connection OV4, on the other hand, extends from the fifteenth optical supply line connection oi15 or external optical distribution connection ir15 via an eleventh optical distribution conductor VL11 to the k+2th internal optical distribution output erk+2. The k+2th internal optical distribution output erk+2 is connected via the n-th input imn and the first output em1 of the first controllable switching module OSM1 to the k+1th internal optical distribution input irk+1, which is connected via a twelfth optical distribution conductor VL12 to the fourteenth external optical distribution output er14, or to the fourteenth output connection oe14.

Thus, a number of dynamically switchable optical connections OV3, OV4 can be added to the optical cross-connect OXC according to the present invention in a simple manner, particularly since, when, by way of example, an additional controllable switching module OSM is being added to the optical cross-connect OXC, the optical supply line and output fibers OZF, OAF which are connected to the optical interfaces OS need not be disconnected or "reinserted" and, instead of this, the internal optical distribution inputs and distribution outputs irk+1 to irn and erk+1 to ern which are provided for this purpose just have to be reconnected within the optical cross-connect OXC. For this purpose, when the internal optical distribution inputs and distribution outputs irk+1 to irn and erk+1 to ern are being "reconnected", the network management system NMS advantageously takes account of the knowledge of the switched optical distribution conductors VL1 to VL13 within the optical distribution frame VR in such a way that the internal optical distribution inputs and distribution outputs irk+1 to irn and erk+1 to ern to be connected in each case are indicated to the servicing personnel, on the distribution rack VR, with the aid of light-emitting diodes— (which are not illustrated in FIG. 2) which are fit, by way of example, to the external and internal distribution inputs (ir1 to irn) and distribution outputs (er1 to ern), which optical distribution inputs and distribution outputs irk+1 to irn and erk+1 to ern must be connected to the outputs em1 to emn and inputs im1 to imn of the controllable switching modules OSM. This considerably reduces the probability of incorrect configuration of the optical cross-connect by "incorrectly" inserted optical distribution conductors VL.

Furthermore, if required, the controllable switching modules OSM, OSM1, OSM2 may be cascaded, in order to improve the degree of blocking freedom of the optical cross-connect OXC.

Although the present invention has been described with reference to specific embodiments, those of skill in the art will recognize that changes may be made thereto without departing from the spirit and scope of the present invention as set forth in the hereafter appended claims.

What is claimed is:

1. An optical cross-connect, comprising:
at least one controllable switching module having a plurality of optical inputs and a plurality of optical outputs; and
a distribution rack which can be monitored via a network management system, the distribution rack having a plurality of external and internal optical distribution inputs and a plurality of external and internal optical distribution outputs which can be connected within the distribution rack via a plurality of optical distribution conductors, each optical distribution conductor having an additional electrical conductor for verification of a respective optical connection, and wherein a plurality of the internal optical distribution outputs are connected to the inputs of the controllable switching module, and the outputs of the controllable switching module are connected to a plurality of the internal optical distribution inputs, with the controllable switching module being controlled taking account of the optical connections which are verified by the network management system.

2. An optical cross-connect as claimed in claim 1, wherein information about the optical connections which are connected from the external optical distribution inputs to the internal optical distribution outputs, as well as information about the optical connections which are connected from the internal optical distribution inputs to the external optical distribution outputs, is available to the network management system based on the verification, with the optical connections being the connections which are taken into account in order to control the controllable switching module, such that, in order to automatically pass on an optical connection from a specific external optical distribution input to a specific external optical distribution output, the internal optical distribution output which is connected to the specific external optical distribution input via an optical connection, and the internal optical distribution input which is connected to the specific external optical distribution input via a further optical connection, are determined with the aid of a network management system, and the determined internal optical distribution output is passed on to the determined internal distribution input with the aid of the controllable switching module.

3. An optical cross-connect as claimed in claim 1, further comprising optical interfaces for connecting the external optical distribution inputs of the distribution rack to optical supply line fibers, and for connecting the external optical distribution outputs to optical output fibers.

4. An optical cross-connect as claimed in claim 1, wherein the external and internal optical distribution inputs and outputs of the distribution rack are combined optoelectrical connections.

5. An optical cross-connect as claimed in claim 1, wherein, in the case of a switched connection of an external optical distribution input to an internal optical distribution output via an optical distribution conductor, the switched optical connection is indicated to the network management system by producing an additional electrical connection as a result of the insertion of the optical connection.

6. An optical cross-connect as claimed in claims 1, wherein a plurality of controllable switching modules may be connected in order to enlarge the automatically controllable optical interfaces of the optical cross-connect.

7. An optical cross-connect as claimed in claim 1, further comprising a plurality of optical light-emitting diodes for at least one of visualizing the electrical connection and assisting the manual insertion of an optical connection.

* * * * *